Feb. 13, 1945. V. E. SPROUSE Re. 22,601

HOSE CLAMP

Original Filed Nov. 11, 1943

INVENTOR,
Verner E. Sprouse,
By Herbert A. Minturn,
Attorney.

Reissued Feb. 13, 1945

Re. 22,601

UNITED STATES PATENT OFFICE 22,601

HOSE CLAMP

Verner E. Sprouse, Columbus, Ind.

Original No. 2,343,484, dated March 7, 1944, Serial No. 509,824, November 11, 1943. Application for reissue May 31, 1944, Serial No. 538,115

7 Claims. (Cl. 24—19)

This invention relates to hose clamps of the type to completely wrap around a flexible hose and constrict it against its rigid fitting, and has for a primary object the provision of an exceedingly substantial and non-slipping end to engage a tongue member which extends through a slot of the clamp encircling band.

A further primary object of the invention is to provide an exceedingly simple structure having a minimum number of parts that will give the utmost safety in use, and further, which may be readily produced without complicated steps in manufacture and assembly.

Figure 2:
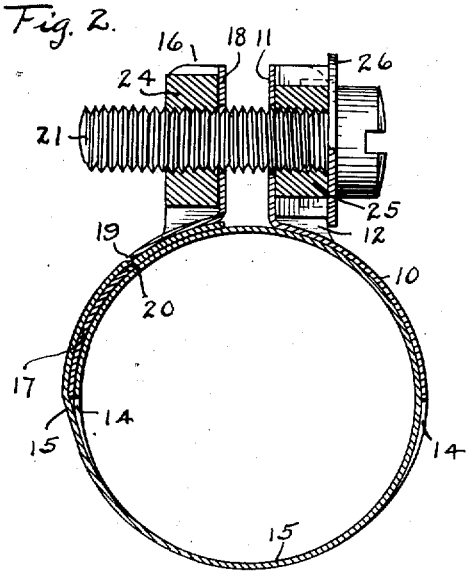
Figure 1:
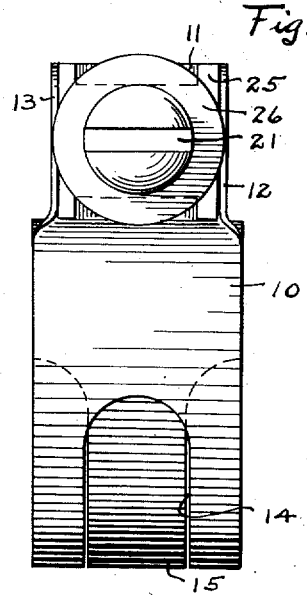
Figure 3:
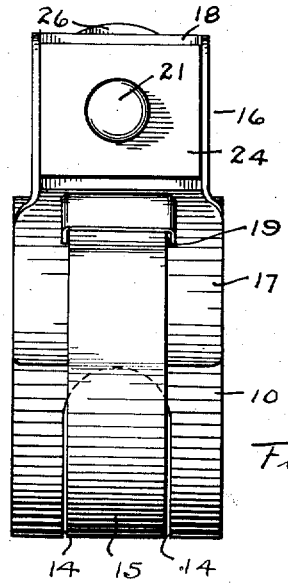

These and other objects and advantages of the invention will become apparent to those versed in the art in the following description of one particular form of the invention as illustrated in the accompanying drawing, in which Fig. 1 is a view in side elevation of a structure embodying the invention;

Fig. 2, a view in section on the line 2—2 in Fig. 1;

Fig. 3, a view in elevation of the side opposite to that shown in Fig. 1; and

Figure 4:
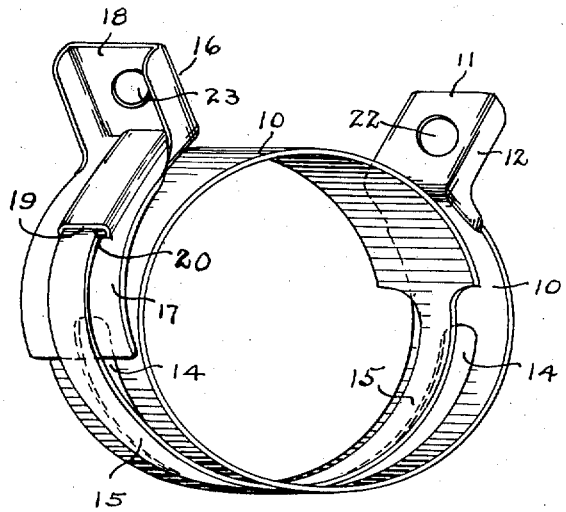

Fig. 4, a view in perspective of the clamp in a released condition.

Like characters of reference indicate like parts in the several views in the drawing.

A strap or band of metal 10 is formed to have an outturned foot 11 from the sides of which are turned-up flanges 12 and 13 extending therefrom and along a short length of the band 10 as a means for preventing the bending of the foot 11 relative to the band 10. Starting at a position adjacent the foot 11, the band 10 is provided with a slot 14 which continues therearound approximately 180 degrees in respect to the finally formed clamp.

The band 10 beyond this slot 14 is reduced in width to form a tongue 15 having a width to permit it to pass through the slot 14. A bracket, generally designated by the numeral 16, is provided with an arcuate pressure member 17 curved to the approximate radius of curvature of the band 10 when in use on a particular size of hose. The bracket 16 is further provided with an outturned foot 18 having side flanges extending back and merging into the pressure member 17 as means to prevent bending of the foot 18 relative to the member 17.

The bracket 16 is further provided with a transverse slot 19 through the pressure member 17 and a portion of this member 17 is raised between the slot 19 and the foot 18 to leave a cavity thereunder having a depth slightly less than the thickness of the tongue 15. The end of the tongue 15 is provided with an offset 20 so that when the tongue 15 is inserted through the slot 19, the under shoulder of the offset will abut the edge of the slot 19 and the remainder of the tongue will pass under the pressure member 17 within the cavity above described. The strap 15 is brought around over the outside of the pressure member 17 to enter the slot 19, as best indicated in Figs. 3 and 4.

A bolt 21 is carried through holes 22 and 23 in the respective feet 11 and 18 as a means for pulling these two feet one toward the other to exert the clamping action. In the form herein shown, a nut 24 abuts the foot 18 to be screw-threadedly engaged by the bolt 21 and, further, preferably, some type of bolt locking means is provided to prevent turning of the bolt 21 under vibration. In the form herein shown, a filler block 25 is placed between the flanges 12 and 13 to bear against the foot 11 and to receive the bolt 21 freely therethrough. This block 25 is in effect H-shaped, Fig. 1, to have cut away portions on the top and bottom sides so that a washer 26 carried under the head of the bolt 21 against the outer face of the block 25 may have at least a top portion bent around over the top of the block 25, that is within the cut away portion, to prevent turning of the washer 26. This washer 26 may be an integral part of the head of the bolt 21 or it may be welded or brazed thereto.

As indicated in the several views in the drawing, the band 10 is so proportioned that there is a sufficient length of the full width portion of the band between the end of the slot 14 and the beginning of the tongue 15 to completely cross over the gap originally presented between the feet 11 and 18 so that the hose within the encircling band 10 will be retained in substantially its true cylindrical shape. By having the tongue 15 come through the slot 14 and be carried over the outside of the pressure member 17, and thence through the slot 19 and under the pressure member 17, when the feet 11 and 18 are drawn one toward the other in the clamping action, the pressure member 17 will be urged against the outer face of the wide portion of the band 10 with a sliding action thereover and with frictional engagement between that portion of the tongue 15 which laps over the pressure member 17 up to the slot 19. From that slot, the remaining end portion of the tongue 15 will itself be pressed against the outer surface of the band 10, into frictional engagement therewith so that the shoulder produced in the tongue 15 at the offset where the tongue passes through the slot 19 will not be permitted to slip out of the abutment with the edge of the slot. Therefore it is to be seen that there is a multiplicity of holding areas set up in this particular form of terminal bracket 16. While normally the bracket 16 may remain a separate part from the tongue 15, it may be desirable in some installations to have the bracket 16 tacked to the tongue 15 by any suitable means, such as by spot welding, so as to save time in the assembling of the clamp with the hose. Full clamping strength may be exerted, however, in the absence of such welding. For any particular size of clamp, the slot 14 will have a length such that the tongue 15, in passing therethrough, will be spaced from the ends of that slot 14 without causing the tongue to bend over such ends or be distorted from the circumferential form corresponding to the circumference of the hose.

While I have herein shown and described my invention in the one particular form, it is obvious that structural variations may be employed without departing from the spirit of the invention and I therefore do not desire to be limited to that precise form beyond the limitations as may be imposed by the following claims.

I claim:

1. A hose clamp comprising a band having a longitudinal slot through a length thereof; a reduced width portion of the band beyond said slot forming a tongue; said band and tongue being rolled and lapped upon itself to have the tongue carried through from the inside to the outside of the band through said slot; an outturned foot on one end of the band adjacent an end of said slot; a bracket having a transverse slot therethrough; a foot on said bracket following substantially the curvature of said rolled band; said tongue emerging from said band slot, from the inside to outside, and passing over the outside of said bracket foot and entering through said bracket slot and extending therebeyond under said bracket; an outturned clamp foot on said bracket at the end thereof toward which said tongue is directed; and means for pulling said band foot and said bracket clamp foot one toward the other as means for reducing the effective diameter of the rolled band.

2. A hose clamp comprising a band having a longitudinal slot through a length thereof; a reduced width portion of the band beyond said slot forming a tongue; said band and tongue being rolled and lapped upon itself to have the tongue carried through from the inside to the outside of the band through said slot; an outturned foot on one end of the band adjacent an end of said slot; a bracket having a transverse slot therethrough; a foot on said bracket following substantially the curvature of said rolled band; said tongue emerging from said band slot, from the inside to outside, and passing over the outside of said bracket foot and entering through said bracket slot and extending therebeyond under said bracket; an outturned clamp foot on said bracket at the end thereof toward which said tongue is directed; and means for pulling said band foot and said bracket clamp foot one toward the other as means for reducing the effective diameter of the rolled band; said bracket foot having a raised portion over said tongue thereunder, to form a tongue receiving channel.

3. A hose clamp comprising a band having a longitudinal slot through a length thereof; a reduced width portion of the band beyond said slot forming a tongue; said band and tongue being rolled and lapped upon itself to have the tongue carried through from the inside to the outside of the band through said slot; an outturned foot on one end of the band adjacent an end of said slot; a bracket having a transverse slot therethrough; a foot on said bracket following substantially the curvature of said rolled band; said tongue emerging from said band slot, from the inside to outside, and passing over the outside of said bracket foot and entering through said bracket slot and extending therebeyond under said bracket; an outturned clamp foot on said bracket at the end thereof toward which said tongue is directed; and means for pulling said band foot and said bracket clamp foot one toward the other as means for reducing the effective diameter of the rolled band; said bracket foot having a raised portion over said tongue thereunder, to form a tongue receiving channel of a depth slightly less than the thickness of said tongue; whereby said bracket will tend under clamping action to rock and to pull the tongue into wrapping compressive engagement over the outside of the bracket foot below the bracket slot and into compressive engagement with the underlying band above the bracket slot.

4. A hose clamp comprising a band having a longitudinal slot through a length thereof; a reduced width portion of the band beyond said slot forming a tongue; said band and tongue being rolled and lapped upon itself to have the tongue carried through from the inside to the outside of the band through said slot; an outturned foot on one end of the band adjacent an end of said slot; a bracket having a transverse slot therethrough; a foot on said bracket following substantially the curvature of said rolled band; said tongue emerging from said band slot, from the inside to outside, and passing over the outside of said bracket foot and entering through said bracket slot and extending therebeyond under said bracket; an outturned clamp foot on said bracket at the end thereof toward which said tongue is directed; and means for pulling said band foot and said bracket clamp foot one toward the other as means for reducing the effective diameter of the rolled band; said tongue having a preformed inwardly offset end portion extending under the bracket to form an abutting shoulder over the edge of said bracket slot.

5. A hose clamp comprising a band having a longitudinal slot through a length thereof; a reduced width portion of the band beyond said slot forming a tongue; said band and tongue being rolled and lapped upon itself to have the tongue carried through from the inside to the outside of the band through said slot; an outturned foot on one end of the band adjacent an end of said slot; a bracket having a transverse slot therethrough; a foot on said bracket following substantially the curvature of said rolled band; said tongue emerging from said band slot, from the inside to outside, and passing over the outside of said bracket foot and entering through said bracket slot and extending therebeyond under said bracket; and outturned clamp foot on said bracket at the end thereof toward which said tongue is directed; and means for pulling said band foot and said bracket clamp foot one toward the other as means for reducing the effective diameter of the rolled band; and an abutment carried by said tongue to engage over the edges of said bracket slot.

6. A hose clamp comprising a flexible hose encircling band; a bracket secured on one end of the band; a second bracket; a pressure member on said second bracket following substantially the curvature of said encircling band; said member having a transverse slot therethrough; a tongue end of said band inserted from the outer side of said member through said slot and extending circumferentially therebeyond under the member; and means for pulling said two brackets, one toward the other, to reduce the effective diameter of the band.

7. A hose clamp comprising a flexible hose encircling band; a bracket secured on one end of the band; a second bracket; a pressure member on said second bracket following substantially the curvature of said encircling band; said member having a transverse slot therethrough; a tongue end of said band inserted from the outer side of said member through said slot and extending circumferentially therebeyond under the member; and means for pulling said two brackets, one toward the other, to reduce the effective diameter of the band; said tongue having an inwardly offset end portion forming an abutting shoulder over an outer edge of said member slot, from which shoulder the tongue extends under the member; and said member having a raised portion over that portion of the tongue extending thereunder.

VERNER E. SPROUSE.